April 8, 1969 R. J. KOERNER 3,438,015
CONTENT ADDRESSABLE MEMORIES
Filed Aug. 16, 1965
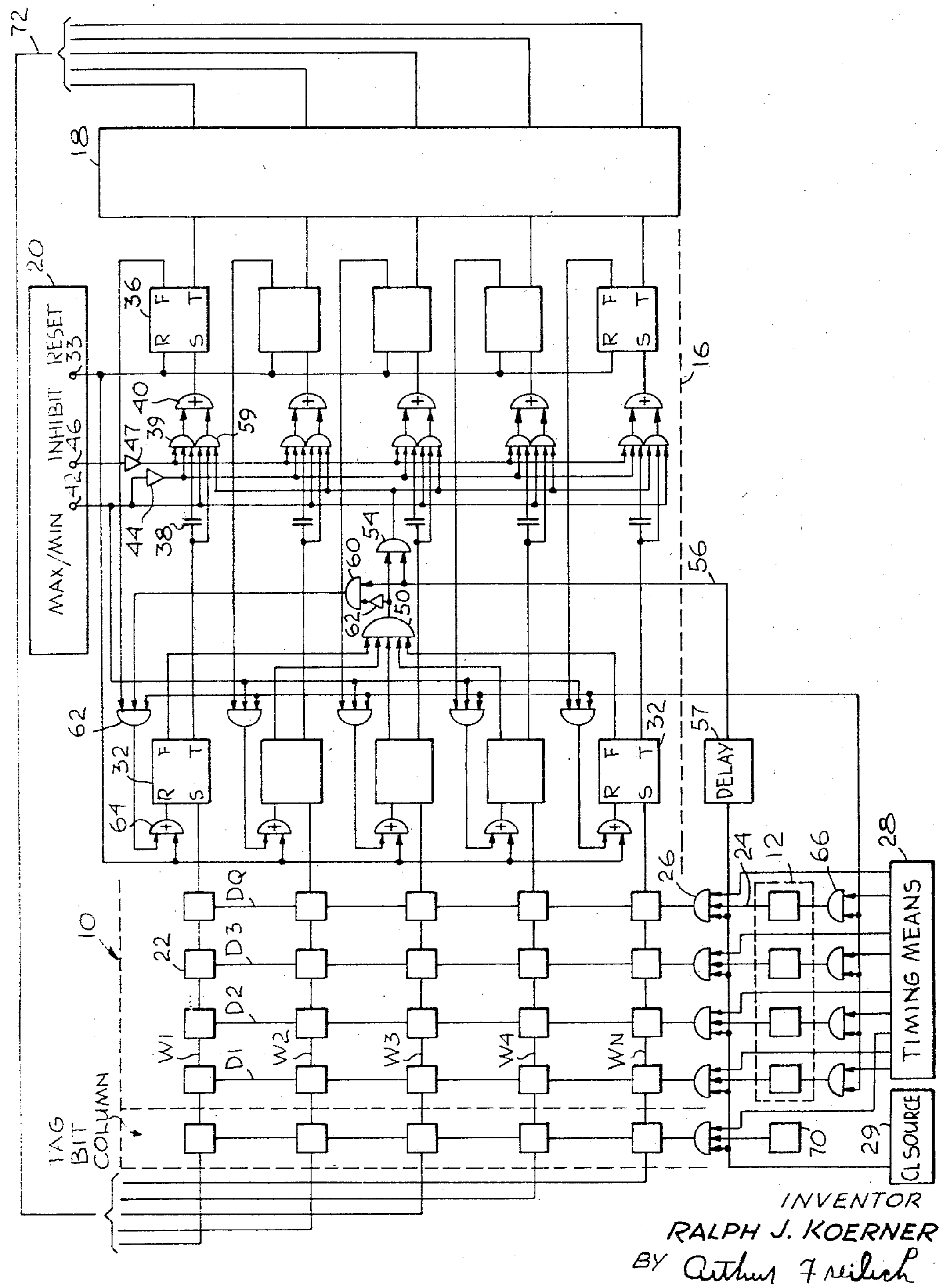
INVENTOR
RALPH J. KOERNER
BY
ATTORNEY 3,438,015

CONTENT ADDRESSABLE MEMORIES

Ralph J. Koerner, Canoga Park, Calif., assignor to The Bunker-Ramo Corporation, Stamford, Conn., a corporation of Delaware Filed Aug. 16, 1965, Ser. No. 479,947
Int. Cl. G11b *5/00*
U.S. Cl. 340—174 14 Claims

ABSTRACT OF THE DISCLOSURE

A content addressable memory which permits the words stored therein to be easily searched to locate the maximum or minimum stored word. In order to locate the maximum stored word, the bits of all of the stored words are compared in order, from the most to least significant with an all "1's" search word. Mismatch signals will be developed at some point in the comparison sequence for all those stored words which are not comprised solely of "1's." If at some point in the comparison sequence only a single stored word exists from which a mismatch signal has not as yet been developed, then this word is of course the maximum stored word.

The invention herein described was made in the course of or under a contract or subcontract thereunder, with Bureau of Ships, Department of the Navy.

This invention relates generally to digital memories and more particularly to improvements in content addressable memories.

U.S. Patent 3,031,650 discloses some basic content addressable memory implementations and discusses the characteristics which distinguish such memories from conventional digital memories. Briefly, the significant distinguishing characteristic is that each word location in a content addressable memory is not uniquely identified by an address as in conventional digital memories but instead content addressable memory locations are selected on the basis of information stored therein; i.e. the contents thereof. Hence, the name content addressable memory.

As a result of selecting locations on the basis of stored information, a memory search times can be considerably reduced at the cost of some additional hardware. That is, in situations where it is desired to select those locations, out of N locations in memory, storing words matching the search word, information identifying those locations can be derived in one memory access period instead of the N such periods required by conventional digital memories. More particularly, whereas it is necessary in a conventional digital memory to sequentially access the contents of each location and compare each accessed word with a search word, comparison of the search word with all of the stored words can be simultaneously effected in a content addressable memory.

Essentially, a content addressable memory operates by causing a binary signal representative of a search word bit to be applied simultaneously to all memory elements storing bits of corresponding significance. Some type of logic means is provided in the memory, such means being operable to generate signals to indicate whether the bits stored in the various memory elements are the same as or different from the corresponding search bit being sought. All elements of a single memory word location are coupled to a common word line and by sensing resultant signals appearing on the word line, a determination is made as to whether or not the word stored in the memory location associated with the word line matches or mismatches the search word.

Whereas the content addressable memory embodiment disclosed in the aforementioned U.S. Patent No. 3,031,650 performs a search which considers both stored bits and stored words in parallel, U.S. patent application Ser. No. 269,009, filed Mar. 29, 1963 by Ralph J. Koerner and Alfred D. Scarbrough, now Patent No. 3,297,995 and assigned to the same assignee as the present application, discloses a content addressable memory embodiment which causes the bits of stored words to be considered serially or sequentially, while the words are still considered in a parallel fashion. Further, whereas the content addressable memory disclosed in the cited U.S. Patent No. 3,031,650 does not specifically discuss the utilization of any search criteria other than "exact match," the cited patent application discloses apparatus which permits other search criteria to be specified. Thus, each stored word can be compared with the search word to determine whether it exactly matches or is "greater than or equal to" or "less than or equal to" the search word. By incorporating the ability to simultaneously compare a search word with a plurality of stored words in accordance with these different criteria, an exceedingly useful content addressable memory system is provided.

In accordance with the present invention, a content addressable memory embodiment is provided which, in addition to having the aforementioned capabilities, also has the capability of being easily searched to locate the maximum or minimum stored word.

Briefly, the present invention is based upon the recognition that the maximum word stored in a content addressable memory can be located by comparing in sequence the bits of all of the stored words with an all "1's" search word. Mismatch signals will be developed at some point in the comparison sequence for all those stored words which are not comprised solely of "1's." If at some point in the comparison sequence only a single stored word exists from which a mismatch signal has not as yet been developed, then this word is of course the maximum stored word. The possibility readily exists however that mismatch signals will be simultaneously developed for the last two or more previously matching words. In this event, these mismatch signals can be disregarded and bits of lesser significance can thereafter be compared to locate a single maximum word or plurality of identical maximum words. In order to locate a minimum word, a similar search can be performed with respect to an all "0's" search word.

In the aforecited patent application, a different sensing device is coupled to each word line, each such sensing device including first and second binary elements which will be respectively referred to as sense store and match store flip-flops. Each sense store flip-flop functions to sense and store the appearance of the initial mismatch signal on the word line to which it is coupled. Each sense store flip-flop is coupled to a match store flip-flop through a gate so that when a sense store flip-flop switches to a mismatch state, the match store flip-flop coupled thereto will also switch to a mismatch state unless the coupling gate is inhibited. In performing an "exact match" search, the gate is never inhibited. In performing a "greater than or equal to" search, the gate is inhibited whenever the active search bit is a "0" because if it causes a mismatch signal to be generated, the corresponding stored bit is of course a "1"

and thus matches the "greater than or equal to " criterion. Therefore, the mismatch signal should not be coupled through to the match store flip-flop. Similarly, when a "less than or equal to" search is performed, the coupling gates should be inhibited whenever the active search bit is a "1."

In the preferred embodiment of the present invention, each sense store flip-flop is switched to the mismatch state in response to the initial mismatch signal appearing on the word line coupled thereto. Whenever a sense store flip-flop switches to a mismatch state, it also switches the match store flip-flop coupled thereto to the mismatch state unless there is no other sense store flip-flop remaining in a match state. Means are provided for monitoring the sense store flip-flops to determine when the last one or more of them switches to a mismatch state. When this occurs, coupling between the sense store and match store flip-flops is inhibited. In addition the state of each match store flip-flop is transferred through a set of transfer gates to the corresponding sense store flip-flops. Comparison of search and stored word bits then continues in order of decreasing significance.

In accordance with a further feature of the invention, means are also provided for locating the word next to the maximum or minimum word. This feature permits information to be developed describing the stored words in order of increasing or decreasing magnitude.

The novel features that are considered characteristic of this invention are set forth with particularity in the appended claims. The invention itself both as to its organization and method of operation, as well as additional objects and advantages thereof, will best be understood from the following description when read in connection with the accompanying drawing which is a block diagram of a content addressable memory embodiment constructed in accordance with the teachings of the present invention.

Attention is now called to the figure which illustrates a content addressable memory constructed in accordance with the present invention and including a memory matrix 10, a search register 12, interconnecting circuit means 14, a plurality of sensing devices 16, a selection device 18, and a control apparatus 20 which exercises control over all of the aforementioned elements.

The exemplary memory matrix 10 includes N (herein, five) rows of memory elements, each row comprised of Q (herein, four) memory elements. Each of the memory elements 22 constitutes a bistable storage device enabling it to assume first and second states respectively representative of binary digits or bits, namely "0" and "1." In addition, each of the memory elements 22 has certain logical properties which enable it to compare its stored bit with one of the bits stored in the search register 12. Each of the matrix rows can appropriately be referred to as a memory location, each location being capable of storing a bit pattern constituting a single word. Although the exemplary memory illustrated herein assumes a four bit word length, it is pointed out that a memory of any arbitrary word length and of any arbitrary word capacity can be constructed in accordance with the present invention.

Each of the matrix columns consists of a plurality of memory elements, each of which serves to store information of corresponding significance in a different row or memory location. That is, words may in fact represent numerical quantities and it is common practice to place bits of corresponding significance in such words in correspondingly positioned memory elements. For example, binary information can be stored in the elements of the memory matrix such that the elements in column 1 of the matrix respectively store the most significant bit of each stored word and the elements of columns 2 and Q of the matrix respectively store bits of decreasing significance.

In addition to the four matrix columns used respectively to store bits of different significance, a tag bit column, column 0, can also be provided for storing tag bits for each of the stored words for purposes to be described hereinafter. Inasmuch as the tag bit column is only necessary where successive searches are being performed to locate the next to the maximum or minimum word, further mention of it will be deferred until the maximum and minimum searches have been described.

A digit line D1 is associated with all of the memory elements 22 of column 1 of the matrix. Similarly, digit lines D2, D3 and DQ are each respectively associated with columns 2, 3, and Q of the matrix. On the other hand, a word line W1 is associated with all of the memory elements in row 1 of the matrix. Similarly, word lines W2, W3, W4 and WN are respectively associated with memory elements of rows 2, 3, 4, and N of the matrix.

The search register is comprised of a plurality of binary storage stages equal in number to the number of matrix columns. Each of the search register stages is provided with an output terminal 24 which is coupled to the input of a gating means 26. The output of each gating means 26 is connected to a corresponding one of the digit lines. When a gating means 26 is enabled, it provides a binary signal on the digit line connected thereto representative of the state of the search register stage also coupled thereto. As previously mentioned, each of the memory elements 22 has certain logic capabilities. These capabilities permit it to compare the state of the search register stage with its own stored state and provide an output or mismatch signal in the event the states do not match. The logical function performable by each memory element 22 can therefore be described by the following logical equation:

$$A\cdot\overline{B}+\overline{A}\cdot B \qquad (1)$$

where A represents the state of a search bit and B represents the state of the memory element. A mismatch signal developed by a memory element 22 will appear on the word line coupled thereto.

Thus, in order to perform a search to determine whether a search word stored in the register 12 exactly matches any of the words stored in the matrix 10, corresponding bits can be compared and the word lines can be monitored to see whether any mismatch signals appear thereon. If no mismatch signal appears on a particular word line after all of the bits have been compared, then it is clear that the word stored in the location associated with that word line exactly matches the search word. Where it is only desired to determine whether a search word exactly matches a stored word, all of the bits can be considered simultaneously. However, where it is, in addition, desired to compare the magnitude of each stored word relative to the search word or relative to the other stored words, it is usually more convenient to consider the bits sequentially in order of decreasing significance. Thus, a timing means 28 incremented in response to signals provided by clock source 29, will enable the gating means 26 in sequence such that the most significant search word bit is compared with all of the most significant stored word bits during an initial time period. The remaining bits are then compared in order of decreasing significance in subsequent time periods down to the least significant bit.

It has been pointed out (e.g. the aforecited patent application) that if bits of a search word and a stored word are compared in sequence, a determination can be made as to whether the stored word is "greater than or equal to" or "less than or equal to" the search word. That is, if the initial mismatch signal appearing on a word line is developed when a search bit "1" is being compared, then the correspondingly significant stored bit must be a "0" and therefore the stored word must be less than the search word. If on the other hand the initial mismatch signal on a word line is developed when a "0" search bit is being compared, then the correspondingly significant stored bit must be a "1" and the stored word will of course be greater than the search word. As previously noted, if no mismatch signals appear on a word line, then the stored word exactly matches the search word.

A different sensing device 16 is connected to each of the word lines. Each sensing device 16 includes a sense store binary element, for example a set-reset flip-flop 32. Each word line is connected to the set input terminal of a different sense store flip-flop 32. All of the flip-flops 32 are initially switched to a match or reset state by reset line 33 controlled by control means 20. In response to the initial mismatch signal appearing on a word line, the sense store flip-flops will switch to their set or mismatch state. Thus, the sense store flip-flop will indicate whether or not a stored word exactly matches the search word.

As already noted, and as discussed in great detail in the aforecited patent application, it is also desirable to be able to determine whether a stored word has a magnitude "greater than or equal to" or "less than or equal to" the search word. Thus, let it be assumed that a word stored in location 1 is in fact less than the search word stored in register 12. In the course of sequentially comparing correspondingly significant bits, at least one mismatch signal will appear on word line W1 which would switch the sense store flip-flop 32 to its mismatch state. However, since the word stored in location 1 would actually match the search word within the stated "less than or equal to" criterion, it is necessary to provide an additional set of match indications which can indicate that although the word does not exactly match the search word, it does match it within the stated criteria. For this purpose, a plurality of match store elements 36, e.g. also set-reset flip-flops are provided. The true output terminal of each sense store flip-flop 32 is coupled to the set input terminal of the associated match store flip-flop 36 through a capacitor 38, an AND gate 39 and an OR gate 40. The match store flip-flops are also initially in a match or reset state. When a sense store flip-flop 32 switches to a mismatch state, the capacitor 38 coupled thereto provides a signal indicating that transition to the input of the corresponding gate 39. Gates 39 will be inhibited whenever a maximum/minimum search is defined by a true signal provided by control means 20 to the line 42 which is coupled through inverter 44 to the gates 39. The gates 39 can also be inhibited by an inhibit signal developed on inhibit line 46 and coupled to gates 39 through inverter 47. The use of inhibit line 46 is discussed in greater detail hereinafter. Whenever gates 39 are not inhibited, the switching of a sense store flip-flop 32 to a mismatch state will also switch the match store flip-flop 36 coupled thereto to a mismatch state. If gates 39 are inhiibted, the match store flip-flops will not of course be switched to a mismatch state. Table I below summarizes the operation of the memory when a false signal is applied to line 42 and indicates when inhibit pulses should be applied to inhibit line 46 in order to enable searches to be conducted comparing the magnitude of each of the stored words with the search word.

TABLE I

| Criteria | Search bit | Stored bit | Switch sense store F-F | Line 46 true |
|---|---|---|---|---|
| Greater than or equal to | 0 | 0 | -------- | x |
| | | 1 | x | x |
| | 1 | 0 | x | -------- |
| | | 1 | -------- | -------- |
| Less than or equal to | 0 | 0 | -------- | -------- |
| | | 1 | x | -------- |
| | 1 | 0 | x | x |
| | | 1 | -------- | x |
| Exact match | 0 | 0 | -------- | -------- |
| | | 1 | x | -------- |
| | 1 | 0 | x | -------- |
| | | 1 | -------- | -------- |

From Table I, it can be seen that when it is merely desired to determine whether the stored words are equal to the search word, no inhibit pulses need be generated by the control means 20. Whenever the "less than or equal to" criterion is defined, control means 20 will generate an inhibit pulse whenever the search bit is a "1." On the other hand, when a "greater than or equal to" criterion is defined, the control means 20 will provide an inhibit pulse whenever the search bit is a "0."

Thus far, the discussion has been principally restricted to searches performed to determine the relative magnitude between stored words and a search word and has essentially constituted a summary of material set forth in greater detail in the aforecited patent application. The present invention is primarily directed to comparing the magnitude of each stored word with the magnitudes of all other stored words in order to locate the maximum, or alternatively the minimum, stored word. Prior to considering the hardware required to accomplish this, attention is called to Table II wherein a plurality of arbitrarily chosen words is illustrated as being stored in the memory matrix.

TABLE II

| | Bit | | | | Sense Store Flip-Flops | | | | |
|---|---|---|---|---|---|---|---|---|---|
| | 1 | 2 | 3 | 4 | $t_0$ | $t_1$ | $t_2$ | $t_3$ | $t_4$ |
| Word 1 | 0 | 0 | 1 | 1 | M | MM | MM | MM | MM |
| Word 2 | 0 | 1 | 0 | 0 | M | MM | MM | MM | MM |
| Word 3 | 1 | 0 | 1 | 1 | M | M | MM | MM | MM |
| Word 4 | 1 | 1 | 0 | 1 | M | M | M | MM | M |
| Word 5 | 1 | 1 | 0 | 0 | M | M | M | MM | MM |
| Search Register | 1 | 1 | 1 | 1 | | | | | |
| | | | 0 | | | | | | |

In order to locate the maximum word stored in the matrix, an all "1's" search word is entered into the search register. Initially, at time $t_0$, all of the sense store flip-flops define a match state. At time $t_1$, the most significant bit, bit 1, of the search register is compared with the correspondingly significant bits of all of the memory locations. As a consequence of this comparison, it will be apparent that the sense store flip-flop associated with word locations 1 and 2 will be driven to a mismatch state leaving three other sense store flip-flops in the match state. At time $t_2$, bit 2 of the search register is compared with bit 2 of all of the memory locations and as a consequence, the sense store flip-flop associated with word location 3 is driven to the mismatch state leaving the sense store flip-flops associated with words 4 and 5 in the match state. At time $t_3$, the two remaining sense store flip-flops in the match state are driven to the mismatch state leaving no sense store flip-flops in the match state. When this occurs, it is essential to reset those sense store flip-flops most recently set to the mismatch state. Thus, the sense store flip-flops associated with word locations 4 and 5 are reset to the match state. Concurrently, bit 3 of the search register can be changed from a "1" to a "0." The search then continues. At time $t_4$, the sense store flip-flop associated with word location 5 is driven to the mismatch state leaving only the sense store flip-flop associated with word location 4 in the match state.

It will thus be apparent that word location 4 stores the maximum word in the content addressable memory. Thus, it should be appreciated that in order to locate the single maximum stored word or group of identical stored words, it is merely necessary to successively compare all of the stored bits with a "1" bit until a single sense store flip-flop remains in a match state. If during any time period, the last one or several sense store flip-flops switch to a mismatch state in a particular time period, they are switched back to a match state and the sequential comparison continues. By changing the search word bit during each time period in which all of the last remaining sense store flip-flops switch to a mismatch state, the search word register at the end of a search will define a word identical to the maximum word stored in memory. It should be apparent from the foregoing that the minimum stored word can be located by performing the same steps set forth with respect to Table II except however, utilizing an all "0's" rather than an all "1's" search word.

A preferred hardware implementation for performing the technique represented by Table II is illustrated in the figure. The implementation is based upon the recognition that as soon as the last sense store flip-flops switch to a mismatch state during any particular time period, coupling between the sense and match store flip-flops can be inhibited and the match states of the switching sense store flip-flops can then be restored by transferring the states of the match store flip-flops to the sense store flip-flops.

More particularly, a monitoring means, OR gate 50, is provided for monitoring the states of the sense store flip-flops. The false output terminal of each sense store flip-flop is connected to the input of OR gate 50 so that as long as any of the flip-flops remains reset or in a match state, OR gate 50 will provide a true output signal. The output of OR gate 50 is connected to the input of AND gate 54. AND gate 54 is enabled by a control signal appearing on line 56 and generated by a delay means 57 a fixed interval after each pulse provided by clock pulse source 29. The output of gate 54 is connected to the input of all of gates 59 whose outputs are in turn connected to the inputs of gates 40. The second input to each gate 59 is derived from the true output terminal of the associated sense store flip-flop 32. The third input to each AND gate 59 is connected to line 42. Thus when a maximum/minimum search is to be performed, a true signal is applied to line 42 enabling gates 59 and disabling gates 39. When a maximum-minimum search is not to be performed, line 42 will be false enabling gates 39 and disabling gates 59.

Let it be assumed that a maximum-minimum search is being performed. As long as any of the sense store flip-flops 32 define a match state after a bit search period, defined by the pulse provided by clock source 29, OR gate 50 will provide a true output signal to gate 54 which in turn will provide a true signal to gates 59 in response to delay means 57 providing a pulse. Consequently, after each bit search period, the contents of the sense store flip-flops are transferred to the match store flip-flops for so long as any of the sense store flip-flops remain in a match state.

It has been seen in Table II that when the match states of the last one or more sense store flip-flops switch to a mismatch state, their match states must be restored. Restoration of sense store flip-flop match states is accomplished by inhibiting transfer from the sense store to the match store flip-flops and instead transferring states from the match store to the sense store flip-flops. This is accomplished via a control gate 60 whose first input is connected through inverter 62 to the output of OR gate 50 and whose second input is connected to the output of delay means 57. The output of control gate 60 controls gates 62 which couple the false output terminals of the match store flip-flops to the reset input terminals of the sense store flip-flops through OR gates 64. Thus, when all of the sense store flip-flops switch to a mismatch state, OR gate 50 will provide a false output signal disabling gate 54 and enabling gate 60. Therefore, in response to the next pulse provided by delay means 57, the states of the sense store flip-flops will not be transferred to the match store flip-flops but rather the match store flip-flops states will be transferred to the sense store flip-flops. Thus, operation of the gates 62 permits the match states of the last one or more sense store flip-flops simultaneously switching to a mismatch state, to be restored, as was shown in time period $t_3$ of Table II.

The output of control gate 60 used to enable the gates 62 is also connected to the inputs of gates 66, each of which is enabled during a different time period as determined by timing means 28. The output of each gate 66 is connected to a different stage of the search register in a manner such that a true output signal provided by a gate 66 will switch the associated search register stage. Accordingly. at the end of a search, the search register will define a word equal to the maximum (or minimum) word or words in memory. The match store flip-flops remaining in a match state will indicate the location of the maximum (or minimum) stored words. The selection or commutator device 18 can then examine and utilize the match indications as, for example, is discussed in the aforecited patent application.

From the foregoing, it should be appreciated that a content addressable memory embodiment has been shown herein which can be very simply and easily searched to locate and determine the maximum (or minimum) word or words stored in the memory. By performing further searches, the next greatest or smallest word can be located. More particularly, if after an initial search has been performed to locate the maximum word, the located word is eliminated and a further search is performed with respect to all the other words, the next greatest word will of course be located. Located words can effectively be eliminated from consideration during subsequent searches by utilizing the tag bit column coupled to the matrix which is comprised of memory elements 22 all coupled to digit line $D_0$. Each of the elements in the tag bit column is associated with a different one of the word lines.

Let it be assumed that all of the elements in the tag bit column initially store a "1" and the corresponding stage 70 associated with the search register 12 also stores a "1." In an initial search, no mismatch signals will appear on the word lines resulting from comparison of the bit stored in stage 70 with the tag bits and thus a maximum/minimum search can be performed as heretofore described. After an initial maximum (or minimum) word is located, the associated bit in the tag bit column is switched to a "0" by the selection device 18 via lines 72. On a subsequent search, comparison of stage 70 and the tag bits will immediately cause a mismatch signal to be developed on the word line associated with the "0" tag bit. Consequently, the sense and match store flip-flops coupled to that word line will immediately switch to a mismatch state and the next greatest word will then be located as being maximum. It should be appreciated that the searches can be continued in this manner to thereby determine the order of the magnitudes of all of the stored words. It should also be appreciated that although a tag column has been provided in association with the matrix to store tag bits, a separate flip-flops or such could be provided for each word, if desired.

The embodiment of the invention in which an exclusive property or privilege is claimed are defined as follows:

1. In combination with memory means storing a plurality of words each comprised of a plurality of ordered bits, means for locating the maximum stored word comprising:
   - means for examining the bits of said stored words in order of decreasing significance for providing a mismatch signal for each of said stored bits equal to "0";
   - a plurality of first storage devices each associated with a different one of said words and responsive to a mismatch signal provided therefrom for switching from a match to a mismatch state;
   - a plurality of second storage devices each associated with a different one of said words;
   - coupling means normally responsive to each of said first storage devices switching to a mismatch state for switching the associated second storage device to a mismatch state; and
   - means responsive to the last of said first storage devices switching to a mismatch state for inhibiting said coupling means from switching said second storage devices and for transferring the state of each of said second storage devices to the first storage device associated therewith.

2. In combination with memory means storing a plurality of words each comprised of a plurality of ordered bits, means for locating the maximum stored word comprising:
   - means defining a plurality of successive time periods;
   - means for examining in order of decreasing significance, corresponding significant bits of said stored words in each of said time periods and for providing a mismatch signal for each of said examined bits equal to "0";

a plurality of first storage devices each associated with a different one of said words and responsive to a mismatch signal provided therefrom for switching from a match to a mismatch state; and means responsive to the last of said first storage devices switching to said mismatch state for switching it to said match state.

3. In combination with memory means storing a plurality of words each comprised of a plurality of ordered bits, means for locating the maximum stored word comprising:

means defining a plurality of succesive time periods;

means for examining in order of decreasing significance, correspondingly significant bits of selected ones of said stored words in each of said time periods and for providing a mismatch signal for each of said examined bits equal to "0";

a plurality of first storage devices each associated with a different one of said words and responsive to a mismatch signal provided therefrom for switching from a match to a mismatch state; and means responsive to the last of said first storage devices switching to said mismatch state for switching it to said match state.

4. In combination with memory means storing a plurality of words each comprised of a plurality of ordered bits, means for locating the maximum stored word comprising:

means defining a plurality of successive time periods;

means for initially examining in order of decreasing significance, corresponding significant bits of said stored words in each of said time periods and for providing a mismatch signal for each of said examined bits equal to "0";

a plurality of first storage devices each associated with a different one of said words and responsive to a mismatch signal provided therefrom for switching from a match to a mismatch state whereby the last one of said first storage devices switching to a mismatch state is associated with the maximum stored word;

means for tagging said maximum stored word; and means for subsequently examining in order of decreasing significance, correspondingly significant bits of non-tagged stored words in each of said time periods and for providing a mismatch signal for each of said examined bits equal to "0."

5. In combination with memory means storing a plurality of words each comprised of a plurality of ordered bits, means for locating the next to maximum stored word comprising:

means for tagging selected ones of said words;

means for locating the maximum untagged word; and means for tagging the located maximum untagged word.

6. The combination of claim 5 wherein said means for locating the maximum untagged word includes:

means defining a plurality of successive time periods;

means for examining in order of decreasing significance, correspondingly significant bits of selected ones of said stored words in each of said time periods and for providing a mismatch signal for each of said examined bits equal to "0"; and a plurality of first storage devices each associated with a different one of said words and responsive to a mismatch signal provided therefrom for switching from a match to a mismatch state whereby the last one of said first storage devices switching to a mismatch state is associated with the maximum stored word.

7. In combination with memory means storing a plurality of words each comprised of a plurality of ordered bits, means for locating the maximum stored word comprising:

a register storing a search word comprised of all "1" bits;

means defining a plurality of successive time periods;

means for comparing said stored bits in order of decreasing significance during successive time periods with one of said search word bits, correspondingly significant stored bits being simultaneously compared, and for providing a mismatch signal whenever compared bits differ;

a plurality of first storage devices each associated with a different one of said words and responsive to a mismatch signal provided therefrom for switching from a match to a mismatch state; and means for monitoring the states of said first storage devices and responsive to the last of said first storage devices switching to a mismatch state during one of said time periods for switching said first storage devices to states defined prior to said one time period.

8. The combination of claim 7 including means responsive to the last of said first storage devices switching to a mismatch state during one of said time periods for switching the state of the search word bit compared during that one time period.

9. The combination of claim 7 wherein said means for monitoring includes a plurality of second storage devices, each coupled to a different one of said first storage devices and normally responsive to it switching to its mismatch state for switching to a mismatch state.

10. The combination of claim 9 including transfer gate means coupling the output of said second storage devices to the input of said first storage devices, said transfer gate means being enabled in response to the last of said first storage devices switching to a mismatch state.

11. In combination with memory means storing a plurality of words each comprised of a plurality of ordered bits, means for locating the minimum stored word comprising:

a register storing a search word comprised of all "0" bits;

means defining a plurality of successive time periods;

means for comparing said stored bits in order of decreasing significance during successive time periods with one of said search word bits, correspondingly significant stored bits being simultaneously compared, and for providing a mismatch signal whenever compared bits differ;

a plurality of first storage devices each associated with a different one of said words and responsive to a mismatch signal provided therefrom for switching from a match to a mismatch state; and means for monitoring the states of said first storage devices and responsive to the last of said first storage devices switching to a mismatch state during one of said time periods for switching said first storage devices to states defined prior to said one time period.

12. In a system including a memory having a plurality of locations each storing a multibit word and including means in each location for sequentially comparing each bit therein with bits of corresponding significance of a search word for providing a mismatch signal whenever compared bits differ and further including a plurality of first binary elements each associated with a different location and each responsive to a first mismatch signal for switching from a match to a mismatch state, the improvement comprising:

a plurality of second binary elements each associated with a different one of said first binary elements and each capable of defining match and mismatch states;

coupling means operable to switch each of said second binary elements to a mismatch state in response to the associated first binary element swtiching to a mismatch state; and means responsive to the last of said first binary elements switching to a mismatch state for inhibiting the operation of said coupling means and for transferring the state defined by each of said second binary elements to the associated first binary element.

13. The system of claim 12 including means defining an all "1's" search word.

14. The system of claim 12 including defining an all "0's" search word.

References Cited

UNITED STATES PATENTS

| | | | |
|---|---|---|---|
| 2,973,508 | 2/1961 | Chadurjian | 340—174 |
| 3,008,129 | 11/1961 | Katz | 340—174 |
| 3,299,409 | 1/1967 | Herman | 340—172.5 |
| 3,339,181 | 8/1967 | Singleton et al. | 340—172.5 |

STANLEY M. URYNOWICZ, Jr., *Primary Examiner.*

U.S. Cl. X.R.

340—172.5